(12) United States Patent
Clayton et al.

(10) Patent No.: US 11,276,192 B2
(45) Date of Patent: Mar. 15, 2022

(54) INTERLEAVED IMAGE CAPTURE FOR DIMENSIONING SYSTEM

(71) Applicant: ZEBRA TECHNOLOGIES CORPORATION, Lincolnshire, IL (US)

(72) Inventors: Richard Mark Clayton, Manorville, NY (US); Patrick Martin Brown, North Medford, NY (US); Chinmay Nanda, Central Islip, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/773,607

(22) Filed: Jan. 27, 2020

(65) Prior Publication Data
US 2021/0233268 A1   Jul. 29, 2021

(51) Int. Cl.
*H04N 13/239*   (2018.01)
*G06T 7/62*   (2017.01)
*H04N 13/254*   (2018.01)

(52) U.S. Cl.
CPC .............. *G06T 7/62* (2017.01); *H04N 13/239* (2018.05); *H04N 13/254* (2018.05); *G06T 2207/10012* (2013.01)

(58) Field of Classification Search
CPC ............ G06T 7/62; G06T 2207/10012; H04N 13/254; H04N 13/239; H04N 13/189; H04N 13/296
See application file for complete search history.

(56) References Cited

U.S. PATENT DOCUMENTS

| 2017/0186183 | A1* | 6/2017 | Armstrong | G01C 3/08 |
| 2018/0089846 | A1* | 3/2018 | Wohlfeld | G06T 7/70 |
| 2018/0203249 | A1* | 7/2018 | Filhaber | G02B 5/0257 |
| 2018/0227570 | A1* | 8/2018 | Page | H04N 13/324 |
| 2020/0388053 | A1* | 12/2020 | Wallack | G06T 7/246 |

OTHER PUBLICATIONS

International Search Report and Written Opinion for International Application No. PCT/US2021/015296 dated Mar. 4, 2021.

* cited by examiner

*Primary Examiner* — Patrick E Demosky
(74) *Attorney, Agent, or Firm* — Yuri Astvatsaturov (57) ABSTRACT

A dimensioning system includes: an emitter assembly to project a planar light beam into a scan volume; first and second image sensors to capture images of overlapping first and second portions of the scan volume; and a controller configured to: in response to an object travelling through the scan volume, for a successive pair of intervals defined by an operational frequency: at a first interval of the pair, (i) control the emitter assembly to project the planar beam and (ii) control the first image sensor to capture a first image of a top and a first side of the object; at a second interval of the pair, (i) control the emitter assembly to project the planar beam and (ii) control the second image sensor to capture a second image of the top and a second side of the object; and generate a three-dimensional image from the first and second images.

14 Claims, 6 Drawing Sheets

INTERLEAVED IMAGE CAPTURE FOR DIMENSIONING SYSTEM

BACKGROUND

Systems for dimensioning objects in motion can include cameras to capture a series images of the object in order to dimension the object. However, the orientation of the object, as well as the speed of travel of the object, may reduce the accuracy of such dimensioning.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a dimensioning system, comprising: an emitter assembly to project a planar light beam into a scan volume; a first image sensor to capture images of a first portion of the scan volume; a second image sensor to capture images of a second portion of the scan volume overlapping with the first portion; and a controller configured to: in response to an object travelling through the scan volume, for a successive pair of intervals defined by an operational frequency: at a first interval of the pair, (i) control the emitter assembly to project the planar light beam and (ii) control the first image sensor to capture a first image of a top and a first side of the object; at a second interval of the pair, (i) control the emitter assembly to project the planar light beam and (ii) control the second image sensor to capture a second image of the top and a second side of the object; and generate a three-dimensional image from the first and second images.

Additional examples disclosed herein are directed to a dimensioning method, comprising: in response to an object travelling through a scan volume, for a successive pair of intervals defined by an operational frequency: at a first interval of the pair, (i) controlling an emitter assembly to project a planar light beam into the scan volume and (ii) controlling a first image sensor to capture a first image of a top and a first side of the object; at a second interval of the pair, (i) controlling the emitter assembly to project the planar light beam and (ii) controlling the second image sensor to capture a second image of the top and a second side of the object; and generating a three-dimensional image from the first and second images.

Figure 1:
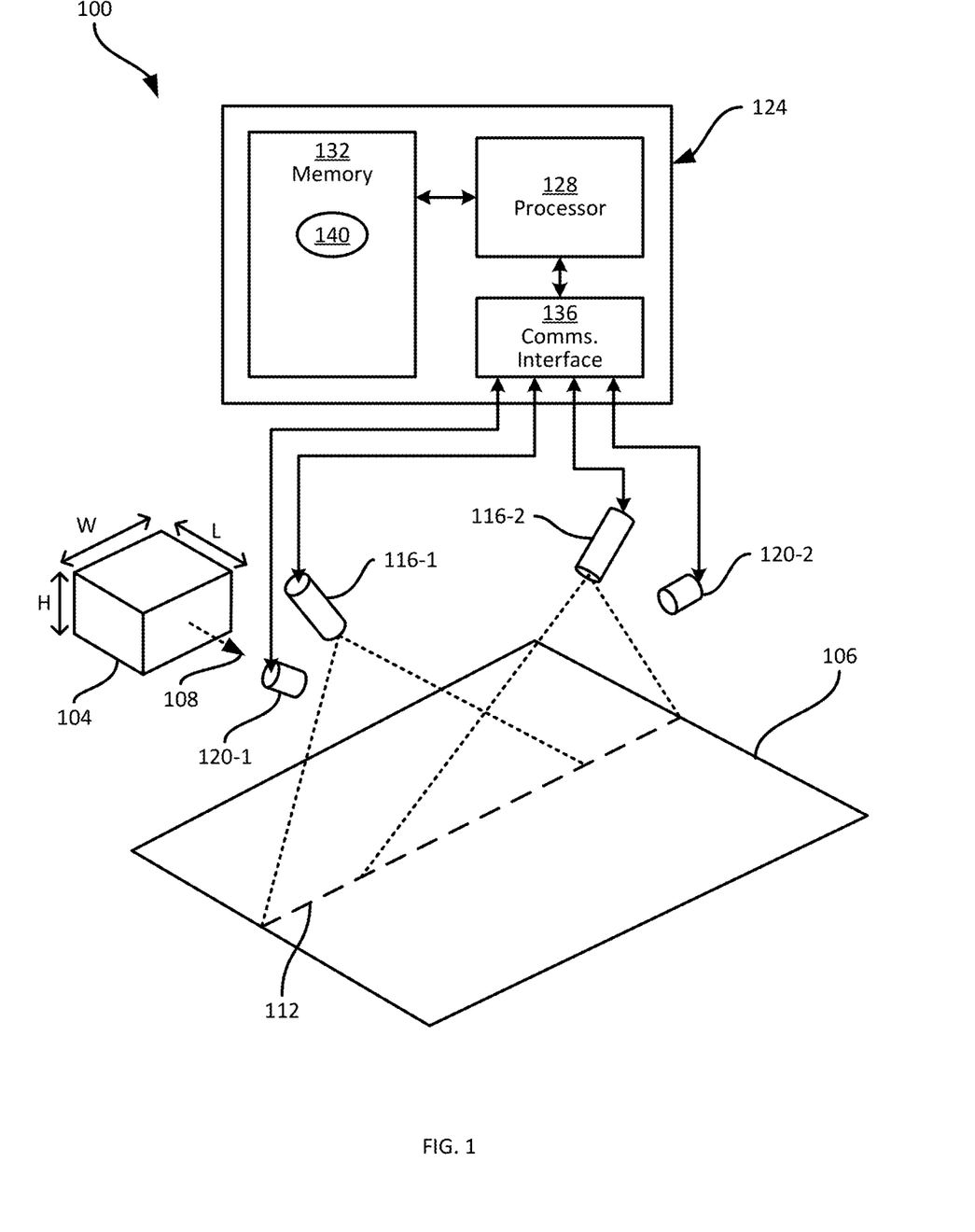
FIG. 1 is a diagram of a dimensioning system.

FIG. 1 shows a dimensioning system 100 to dimension objects in motion. For example, the system 100 can be employed to dimension an object such as a package 104 as the package 104 moves through a scan volume 106 defined by the system 100 in a direction 108. Dimensioning the package 104 includes determining the height "H", width "W" and length "L" of the package 104. The package 104 may also be carried on a pallet (e.g. by a forklift or other mechanism) in some examples. Although the package 104 is illustrated as having the shape of a rectangular prism, the system 100 may also be employed to dimension a wide variety of other objects, including objects with irregular shapes. When the object to be dimensioned has a non-rectangular shape, the system 100 can be configured to dimension the object via generation of a rectangular bounding box representing the maximum height, width and length of the object.

The base of the scan volume 106 is illustrated in FIG. 1, while the height of the scan volume 106 is not illustrated for legibility. As will be apparent to those skilled in the art from the discussion below, the scan volume can have a cubic or rectangular prism shape, the dimensions of which depend on the components discussed below. In other examples, the scan volume 106 can have various other shapes, again dependent on the capabilities and arrangement of the components of the system 100.

Movement of the package 104 through the scan volume 106 can be achieved by various mechanisms, including carrying by a human operator, a vehicle such as a forklift, transport on a conveyor belt, or the like.

The system 100 includes an emitter assembly that is configured to project a planar light beam 112 into the scan volume 106. The planar light beam, in other words, forms a curtain through which the object 104 travels along the direction 108. When the object 104 traverses the curtain, a line of light is projected onto the object 104, and can be employed to capture data corresponding to the object 104 in order to dimension the object 104.

In the present example, the emitter assembly includes first and second emitters 116-1 and 116-2, such as laser emitters each configured to emit a planar beam of light over at least a portion of the scan volume 106. As shown in FIG. 1, the beams emitted by the emitters 116 overlap over at least a portion of the scan volume 106. In addition, the emitters 116 are angled inwards, e.g. towards a center of the scan volume 106.

The system 100 also includes a first image sensor 120-1 and a second image sensor 120-2. The image sensors 120, which may also be referred to as cameras 120, can each be implemented as any suitable camera, to capture color (e.g. RGB) or infrared images of the scan volume. More specifically, each image sensor 120 has a field of view encompassing a respective portion of the scan volume 106. That is, the image sensors 120 are arranged to provide distinct fields of view from one another to provide complete capture of the top and sides of the object to be dimensioned. The fields of view of the cameras 120 overlap at least partially within the scan volume 106, as will be discussed in greater detail below. The image sensors 120 are also offset from the emitters 116.

The system 100 also includes, as shown in FIG. 1, a controller 124 which can be implemented as any suitable computing device, such as a desktop computer deployed in the vicinity of the scan volume 106). The controller 124 includes a processor 128, interconnected with a non-transitory computer readable storage medium, such as a memory 132. The memory 132 includes a combination of volatile memory (e.g. Random Access Memory or RAM) and non-volatile memory (e.g. read only memory or ROM, Electrically Erasable Programmable Read Only Memory or EEPROM, flash memory). The processor 128 and the memory 132 each comprise at least one integrated circuit.

The controller 124 can include input and/or output devices, such as a keyboard, a mouse, a speaker, a display, and the like (not shown in FIG. 1). In addition, the controller 124 includes a communications interface 136 enabling the controller 124 to communicate with the emitters 116 and the image sensors 120 in order to control the operation of those components. The communications interface 136 can therefore include any suitable combination of hardware, firmware and software elements. For example, the communications interface can be a Universal Serial Bus (USB) interface with a plurality of ports and a corresponding microcontroller. Various other interfaces will also occur to those skilled in the art.

The memory 132 stores computer readable instructions for execution by the processor 128. In particular, the memory 132 stores a dimensioning application 140 (also referred to simply as the application 140) which, when executed by the processor 128, configures the processor 128 to perform various functions discussed below in greater detail, to capture images of the package 104 and process the images for dimensioning the package 104. The application 140 may also be implemented as a suite of distinct applications in other examples. Those skilled in the art will appreciate that the functionality implemented by the processor 128 via the execution of the application 140 may also be implemented by one or more specially designed hardware and firmware components, such as FPGAs, ASICs and the like in other embodiments.

In general, the controller 124 controls the emitters 116 to project the beam 112 onto the scan volume 106 at a given frequency. The controller 124 also causes the image sensors 120 to capture a sequence of images of the scan volume 106 as the package 104 travels through the scan volume 106. As will be apparent, the beam 112 impacts different areas of the package 104 as the package 104 travels through the scan volume 106. By tracking the position of the package 104 during such image capture operations, e.g. via fiducial markers on the package 104 or a transporter such as a forklift, the controller 124 can correlate data extracted from the images with respective positions of the package 104 and so arrange the extracted data (e.g. points in a point cloud) relative to one another.

The projection of the beam 112 visible on the package 104 in the sequence of images can be extracted from the images and employed to generate a three-dimensional representation (e.g. a point cloud, or a portion thereof) of the package 104, which can then be used to dimension the package 104. Various techniques will occur to those skilled in the art for the tracking of object position, extraction of beam projections and generation a of composite three dimensional image.

As will be discussed in greater detail below, the controller 124 is additionally configured to control the emitters 116 and image sensors 120 to interleave the capture of images, such that at least a portion of the package 104 is imaged at a greater frequency than in systems in which the image sensors capture images simultaneously. The greater imaging frequency enabled by the system 100 in turn enables a closer distribution of points in the point cloud representing the object, improving the detail with which the object is represented in the point cloud.

Figure 2:
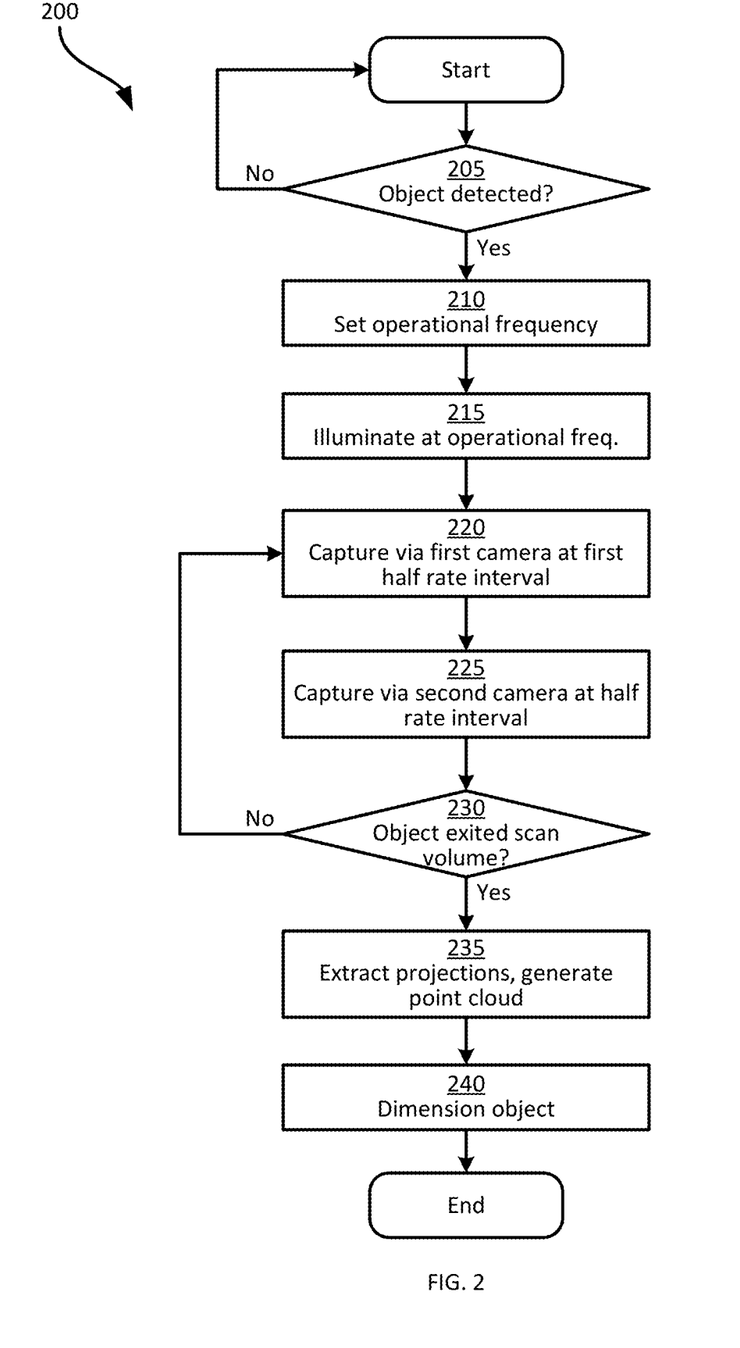
FIG. 2 is a flowchart of a dimensioning method.

Turning to FIG. 2, a flowchart of a dimensioning method 200 is illustrated. The method 200 will be discussed below in conjunction with its performance by the system 100. In particular, the blocks of the method 200 are performed by the controller 124 via communication with the emitters 116 and image sensors 120.

At block 205, the controller 124 is configured to determine whether an object, such as the package 104, has entered the scan volume 106. The determination at block 205 may be based on a motion sensor such as a lidar sensor, a pressure plate or the like disposed in or near the scan volume 106. The determination at block 205 may also be based on images captured by one or both of the image sensors 120. For example, at least one of the image sensors 120 can be configured to capture a continuous stream of images, and the controller 124 can process the images to determine whether an object has entered the scan volume 106.

When the determination at block 205 is negative, the system 100 awaits the arrival of an object. When the determination at block 205 is affirmative, however, the controller 124 proceeds to block 210. At block 210, the controller 124 sets an operational frequency for the system 100. The operational frequency defines both a frequency at which the emitters 116 will project the beam 112 into the scan volume, and a frequency at which the image sensors 120 will capture images, in the remainder of the method 200.

The operational frequency can be set according to a variety of mechanisms. For example, the memory 132 can store a preconfigured operational frequency and the processor 128 can retrieve that preconfigured operational frequency at block 210. In other examples, the controller 124 can determine (e.g. from the memory 132 or by request to the image sensors 120) a maximum capture frequency for the image sensors 120. Having determined the maximum capture frequency for the image sensors 120, the controller 124 can set the operational frequency at twice the maximum capture frequency (i.e. a greater frequency than either image sensor 120 is capable of capturing images at).

More generally, whether the operational frequency is preconfigured and stored in the memory 132 or determined dynamically based on image sensor parameters, the operational frequency can be greater than the capture rate of the image sensors 120 individually. The operational frequency is not, however, greater than the maximum illumination rate of the emitters 116.

At block 215, the controller 124 is configured to initiate projection of the beam 112 at the operational frequency. That is, the controller 124 controls the emitters 116 to simultaneously emit planar beams in order to form the beam 112 within the scan volume 106. The beam 112 is projected once for each of a sequence of intervals defined by the operational frequency. For example, for an operational frequency of 300 Hz, the beam 112 is projected into the scan volume 106 once for each of three hundred intervals per second (each interval having a length of about 3.3 milliseconds, in this example), with each projection having a duration smaller than the length of the interval. A wide variety of other operational frequencies are also contemplated, with corresponding lengths and numbers of intervals defined by the operational frequency.

The performance of block 215 continues throughout the performance of blocks 220, 225 and 230 of the method 200 as discussed below. In general, blocks 220, 225 and 230 involve, for each successive pair of intervals defined by the operational frequency, capturing one image using the image sensor 120-1, and capturing another image using the image sensor 120-2. The emitters 116 operate for all image captures, and therefore operate at twice the capture frequency of either image sensor 120 (i.e. at a frequency equal to the combined capture frequency of the image sensors 120).

Figure 3:
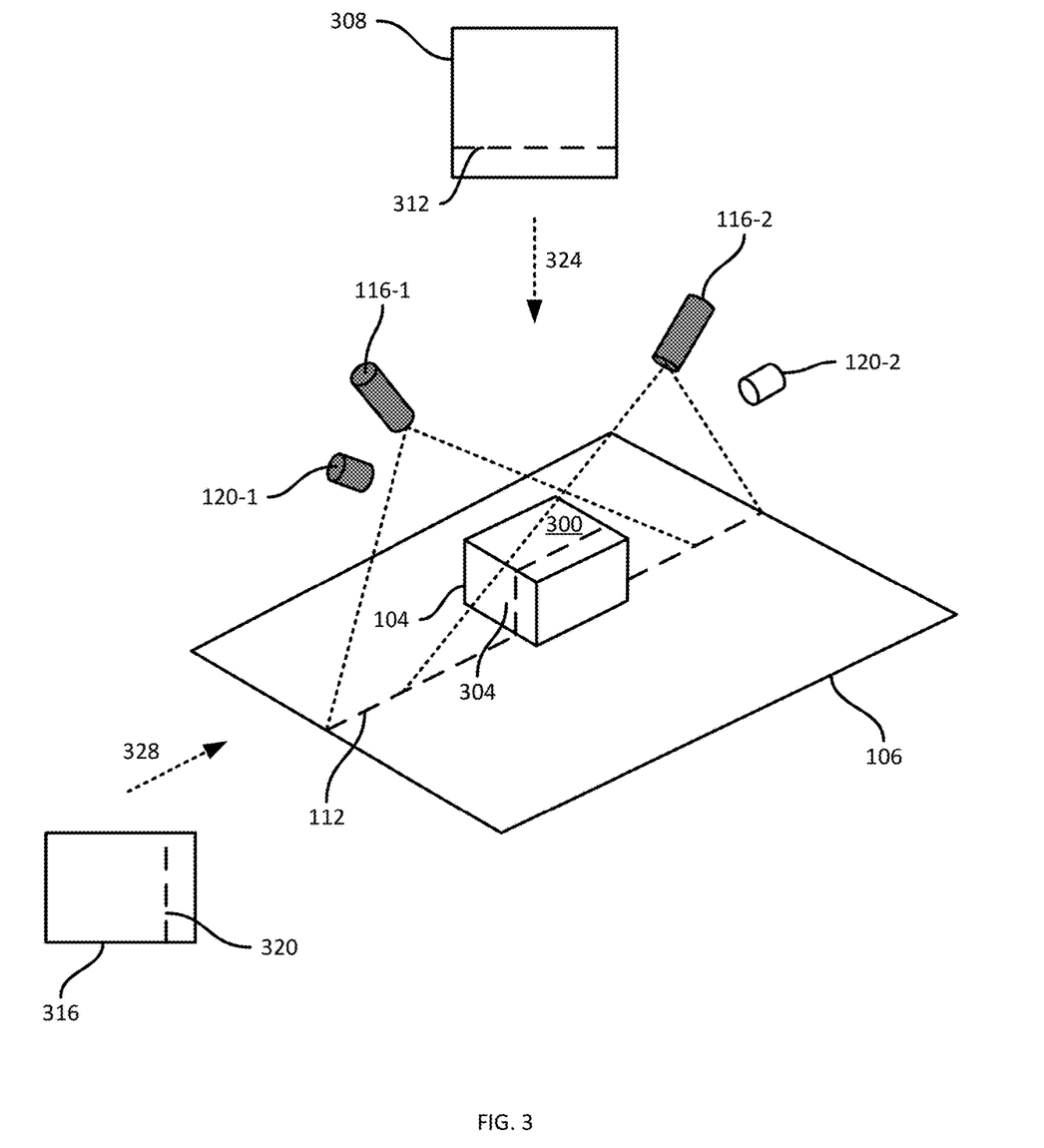
FIG. 3 is a diagram of an example performance of block 220 of the method of FIG. 2.

At block 220, corresponding to a first interval of a pair of successive intervals, therefore, the controller 124 controls the emitters 116 to project the beam 112 (as discussed above in connection with block 215), and also controls the image sensor 120-1 to capture an image of the package 104. Turning to FIG. 3, an example performance of block 220 (in concert with block 215) is illustrated. In particular, the emitters 116 and the image sensor 120-1 are shaded to denote activity, while the image sensor 120-2 is inactive and therefore not shaded. The package 104 has entered the scan volume 106 and a portion of the beam 112 therefore is projected onto the package 104.

The image captured by the image sensor 120-1, as will be apparent from the physical positioning of the image sensor 120-1 relative to the scan volume 106, depicts at least a top 300 and a first side 304 of the package 104. As will be apparent to those skilled in the art, the image captured by the image sensor 120-1 also depicts other parts of the scan volume 106. While the top 300 and side 304 indicated in FIG. 3 correspond to top and side surfaces of the package 104, in other examples the package 104 may have a different shape, or a different orientation, from that shown in FIG. 3. In such examples, the image captured by the image sensor 120-1 may depict multiple surfaces of the object 104. In general, the portion of the object 104 referred to as the side 304 is the portion visible only to the image sensor 120-1, while the top 300 refers to the portion of the object 104 visible to both image sensors 120.

FIG. 3 also illustrates parts of the resulting image captured by the image sensor 120-1, including a part 308 depicting the top 300 of the package 104 and a projection 312 of the beam 112 visible thereon. The image also includes a part 316 depicting the side 304 of the package 104 and a projection 320 of the beam 112 visible thereon.

As will be apparent, the parts 308 and 316 have been realigned to appear as if viewed from an overhead direction 324 and a sideways direction 328, respectively, for simplicity. In the image captured at block 220, both parts 308 and 316 appear in the image at different orientations than those shown in FIG. 3, based on the position and characteristics (e.g. focal length and the like) of the image sensor 120-1.

Figure 4:
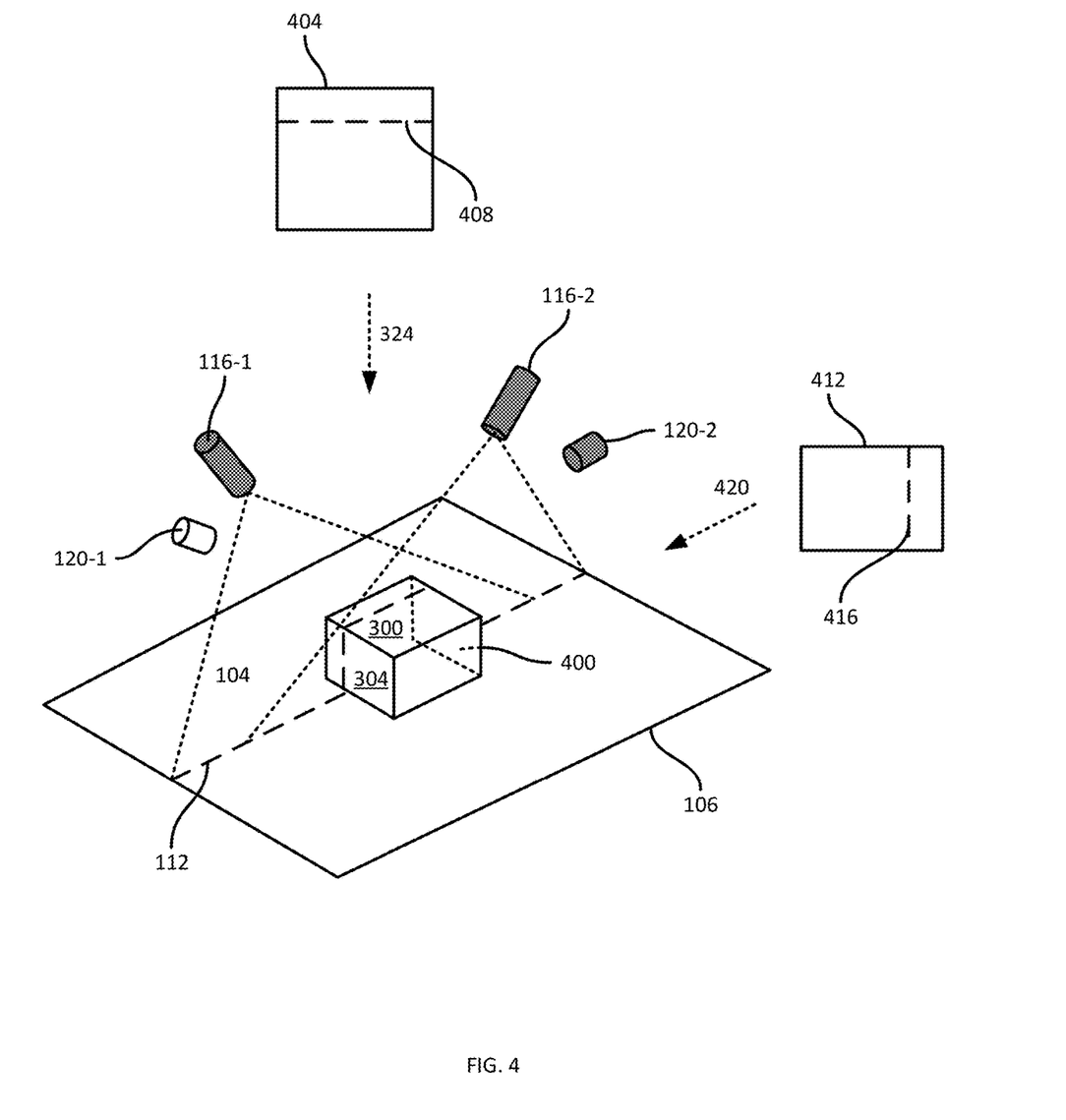
FIG. 4 is a diagram of an example performance of block 225 of the method of FIG. 2.

Returning to FIG. 2, at block 225, corresponding to a second interval of the pair of successive intervals mentioned above, the controller 124 controls the emitters 116 to project the beam 112 (as discussed above in connection with block 215), and also controls the image sensor 120-2 to capture an image of the package 104. Turning to FIG. 4, an example performance of block 220 (in concert with block 215) is illustrated. In particular, the emitters 116 and the image sensor 120-2 are shaded to denote activity, while the image sensor 120-1 is inactive and therefore not shaded. The package 104 has traveled further into the scan volume 106 relative to FIG. 3, and the portion of the beam 112 projected onto the package 104 therefore appears at a different location on the package 104.

The image captured by the image sensor 120-2, as will be apparent from the physical positioning of the image sensor 120-2 relative to the scan volume 106, depicts at least the top 300 and a second side 400 of the package 104. FIG. 4 also illustrates parts of the resulting image captured by the image sensor 120-2, including a part 404 depicting the top 300 of the package 104 and a projection 408 of the beam 112 visible thereon. The image also includes a part 412 depicting the side 400 of the package 104 and a projection 416 of the beam 112 visible thereon.

As with FIG. 3, the parts 404 and 412 have been realigned to appear as if viewed from the overhead direction 324 and a sideways direction 420, respectively, for simplicity. In the image captured at block 225, both parts 404 and 412 appear in the image at different orientations than those shown in FIG. 4, based on the position and characteristics (e.g. focal length and the like) of the image sensor 120-2.

Referring again to FIG. 2, at block 230 the controller 124 is configured to determine whether the object (e.g. the package 104) has left the scan volume 106. When the determination at block 230 is negative, the controller 124 returns to block 220. In other words, as long as the package 104 is within the scan volume 106, the controller 124 continues to control the emitters 116 to project the beam 112 at the operational frequency, and to control the image sensors 120 to capture interleaved images at half of the operational frequency. Thus, images of the package 104 are captured at the operational frequency (simultaneously with activation of the emitters 116), but at each capture instance, only one of the image sensors 120 is active. For an operational frequency of 300 Hz, for example, each image sensor 120 need only operate at 150 Hz, while the total rate of image capture is 300 Hz.

Figure 5:
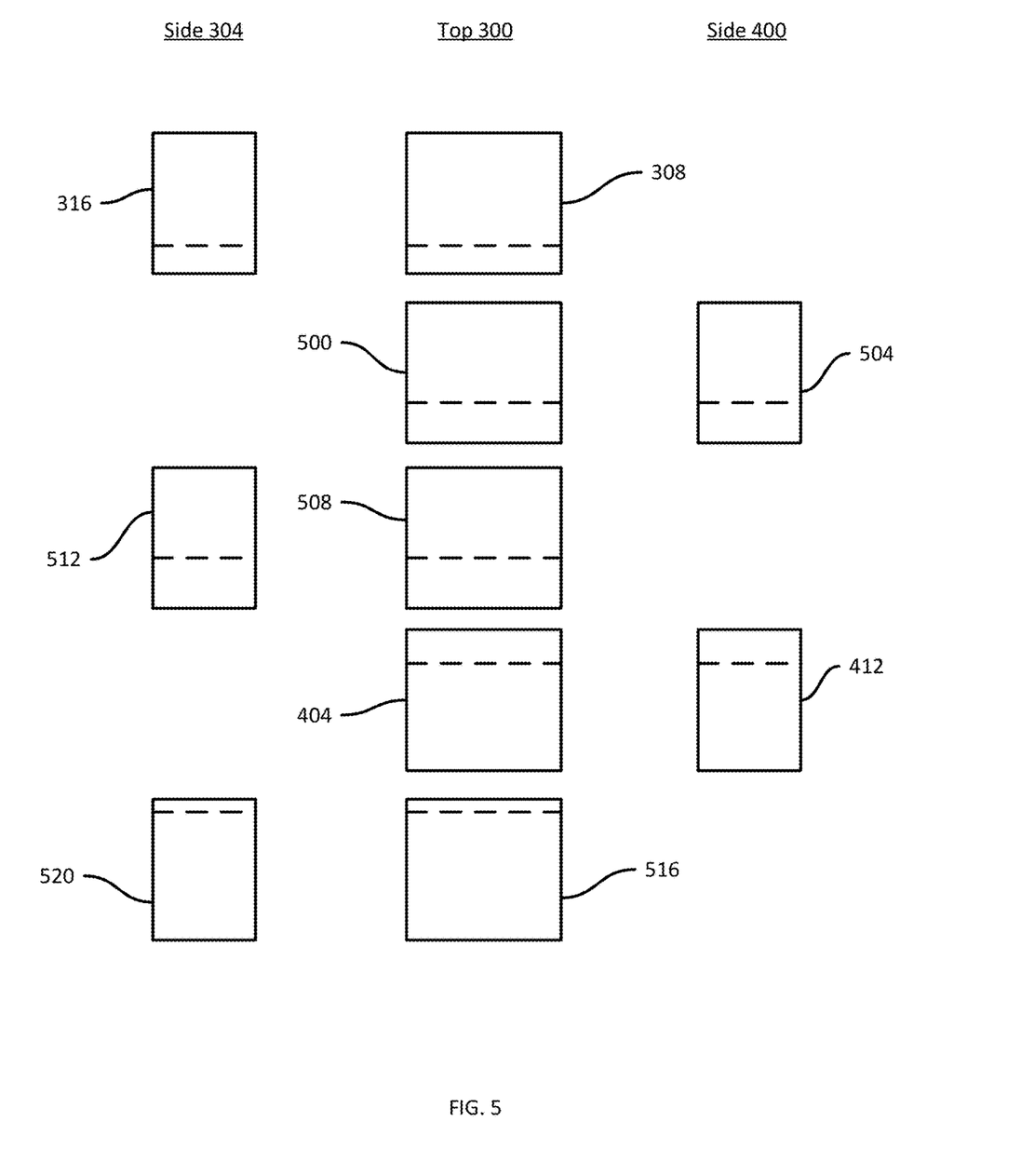
FIG. 5 is a diagram illustrating images captured via repeated performances of blocks 220 and 225 of the method of FIG. 2.

Turning to FIG. 5, additional parts of images captured at successive performances of blocks 220 and 225 are illustrated. In particular, FIG. 5 illustrates the image parts 308 and 316 mentioned above at a first performance of block 220, followed by image parts 500 and 504 (captured by the image sensors 120-2) at a first performance of block 225. The following performance of block 220 yields the image parts 508 and 512 (captured by the image sensor 120-1), and a further performance of block 225 yields the image parts 404 and 412 as mentioned earlier. Finally, an additional performance of block 220 is also illustrated, corresponding to another performance of block 220.

When the determination at block 230 is affirmative, control of the emitters 116 and the image sensors 120 can be interrupted, and at block 235 the controller 124 can extract the projections of the beam 112 visible in the images captured via blocks 220 and 225. Based on the extracted projections, the controller 124 can generate a three-dimensional representation of the package 104, which may also be referred to as a point cloud. The controller 124 is configured to correlate each image with a respective position of the package 104 within the scan volume 106. Based on the correlations, and on the known position of each image pixel within the scan volume 106 (e.g. obtained from calibration data defining the physical positions and operational parameters of the image sensors 120 and the emitters 116), the controller 124 can then arrange the captured images relative to one another to generate the point cloud.

Figure 6:
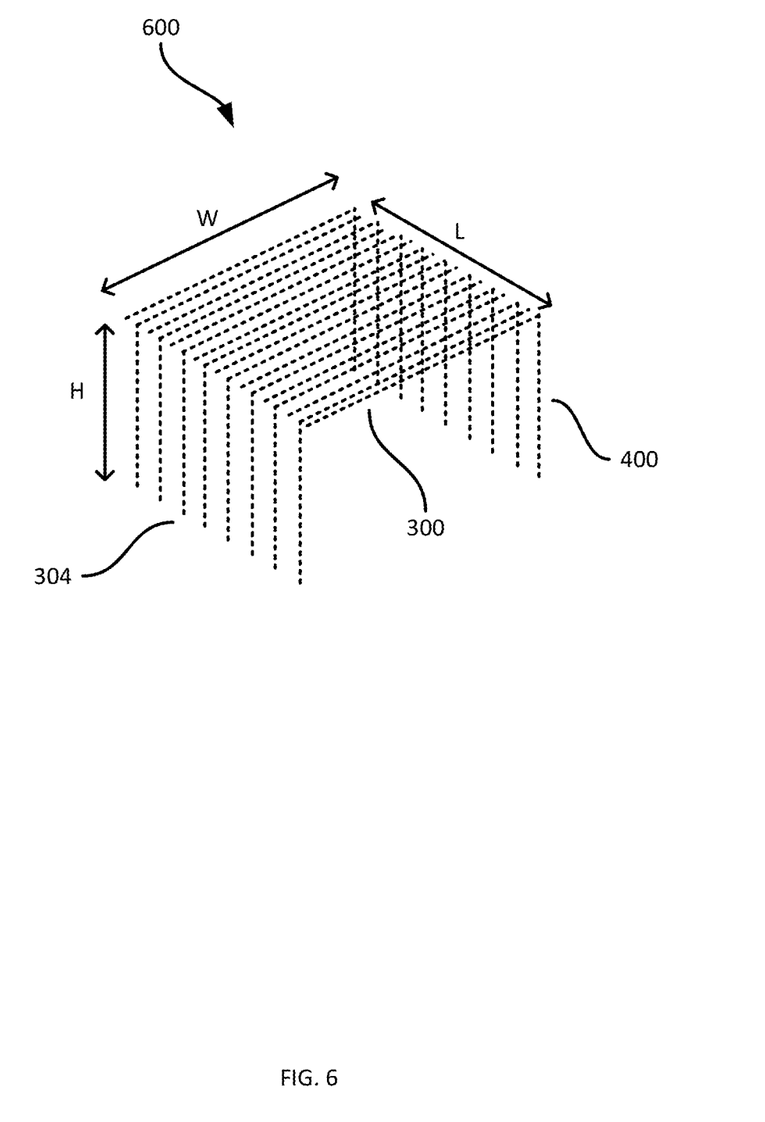
FIG. 6 is a diagram illustrating an example point cloud generated at block 235 of the method of FIG. 2.

Turning to FIG. 6, an example point cloud 600 generated at block 235 from a plurality of images captured via successive performances of blocks 220 and 225 is shown. As illustrated in FIG. 6, the sides 304 and 400 of the package 104 are represented by a smaller number of samples than the top 300 of the package 104, because each of blocks 220 and 225 result in imaging of the top 300, while the side 304 is imaged only at block 220 and the side 400 is imaged only at block 225. The point cloud 600 illustrated in FIG. 6 may be a portion of a larger point cloud, segmented from the larger point cloud to isolate the package 104 for dimensioning. The point cloud 600 may also be referred to as a three-dimensional image.

At block 240, the controller 124 determines at least one dimension of the package 104 based on the point cloud generated at block 235. For example, the controller 124 can determine the previously mentioned height, width and length H, W and L by detecting boundaries of the package 104 according to any suitable dimensioning mechanism. In other examples, the controller 124 can be configured to transmit the point cloud to another computing device for dimensioning. As will now be apparent, the additional sampling of the top 300 of the package 104 that results from interleaved image captured as implemented by the controller 124 may enable the length L to be determined with greater accuracy than in an implementation in which the image sensors 120 are triggered simultaneously.

Variations to the above systems and methods are contemplated. For example, in other embodiments the system 100 can include more than two image sensors 120, further reducing the necessary capture rate for each image sensor 120 while maintaining a sampling rate for the top 300 of the package 104 at the operational frequency.

In further examples, the computing device 124 can perform additional actions during processing of the image data captured via performance of the method 200. For example, prior to generating the point cloud at block 235, the computing device 124 can be configured to determine whether the images captured via blocks 220-230 contain anomalous data. Examples of anomalous data include a dead or stuck pixel appearing in at least some of the images, indicating a partial malfunction of an image sensor. In such examples, the computing device 124 can omit the anomalous data (e.g. delete the dead or stuck pixel(s)) prior to generating the point cloud at block 235.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A dimensioning system, comprising:
   an emitter assembly to project a planar light beam into a scan volume;
   a first image sensor to capture images of a first portion of the scan volume;
   a second image sensor to capture images of a second portion of the scan volume overlapping with the first portion; and
   a controller configured to:
      in response to an object travelling through the scan volume, for a successive pair of intervals defined by an operational frequency:
         select the operational frequency equal to twice a maximum capture rate of the first and second image sensors;
         select a capture rate of the first and second image sensors to half of the operational frequency;
         at a first interval of the pair, (i) control the emitter assembly to project the planar light beam and (ii) control the first image sensor to capture a first image of a top and a first side of the object;
         at a second interval of the pair, (i) control the emitter assembly to project the planar light beam and (ii) control the second image sensor to capture a second image of the top and a second side of the object; and
         generate a three-dimensional image from the first and second images.

2. The dimensioning system of claim 1, wherein the controller is further configured to detect that the object has entered the scan volume.

3. The dimensioning system of claim 1, wherein the controller is further configured to repeat the controlling of the emitter assembly, the first image sensor and the second image sensor for each of a plurality of successive pairs of the intervals.

4. The dimensioning system of claim 3, wherein the controller is further configured to terminate the control of the emitter assembly, the first image sensor and the second image sensor in response to detecting that the object has left the scan volume.

5. The dimensioning system of claim 1, wherein the emitter assembly includes at least two laser emitters.

6. The dimensioning system of claim 1, wherein the controller is configured, in order to generate the three-dimensional image, to extract projections of the planar light beam on the object from the first and second images.

7. The dimensioning system of claim 1, wherein the controller is further configured to dimension the object based on the three-dimensional image.

8. A dimensioning method, comprising:
   in response to an object travelling through a scan volume, for a successive pair of intervals defined by an operational frequency:
      selecting the operational frequency equal to twice a maximum capture rate of a first image sensor and a second image sensor;
      selecting a capture rate of the first image sensor and the second image sensor to half of the operational frequency;
      at a first interval of the pair, (i) controlling an emitter assembly to project a planar light beam into the scan volume and (ii) controlling the first image sensor to capture a first image of a top and a first side of the object;
      at a second interval of the pair, (i) controlling the emitter assembly to project the planar light beam and (ii) controlling the second image sensor to capture the second image of the top and a second side of the object; and
      generating a three-dimensional image from the first and second images.

9. The dimensioning method of claim 8, further comprising: detecting that the object has entered the scan volume.

10. The dimensioning method of claim 8, further comprising: repeating the controlling of the emitter assembly, the first image sensor and the second image sensor for each of a plurality of successive pairs of the intervals.

11. The dimensioning method of claim 10, further comprising: terminating the controlling of the emitter assembly, the first image sensor and the second image sensor in response to detecting that the object has left the scan volume.

12. The dimensioning method of claim 8, wherein generating the three-dimensional image comprises extracting projections of the planar light beam on the object from the first and second images.

13. The dimensioning method of claim 8, further comprising: dimensioning the object based on the three-dimensional image.

14. The dimensioning method of claim 8, further comprising: selecting the operational frequency.

* * * * *